US011654880B2

(12) United States Patent
Moore, III (10) Patent No.: US 11,654,880 B2
(45) Date of Patent: May 23, 2023

(54) ADJUSTING PERFORMANCE OF AN ELECTRIC MOTOR IN A HYBRID VEHICLE DURING A COMBUSTION EVENT

(71) Applicant: Robert Bosch GmbH, Stuttgart (DE)

(72) Inventor: Charles Leander Moore, III, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 17/411,967

(22) Filed: Aug. 25, 2021

(65) Prior Publication Data
US 2023/0066486 A1 Mar. 2, 2023

(51) Int. Cl.
*B60W 20/10* (2016.01)
*B60W 10/08* (2006.01)
*B60W 10/06* (2006.01)
*B60W 50/04* (2006.01)

(52) U.S. Cl.
CPC ............ *B60W 20/10* (2013.01); *B60W 10/06* (2013.01); *B60W 10/08* (2013.01); *B60W 50/04* (2013.01); *B60W 2510/06* (2013.01); *B60W 2510/081* (2013.01); *B60W 2710/083* (2013.01)

(58) Field of Classification Search
CPC ...... B60W 20/10; B60W 20/00; B60W 10/06; B60W 10/08; B60W 50/04; B60W 2510/06; B60W 2510/081; B60W 2710/083; B60K 6/445
See application file for complete search history.

(56) References Cited

U.S. PATENT DOCUMENTS

| 7,580,779 | B2 * | 8/2009 | Zillmer ................. B60W 10/08 701/22 |
| 10,033,315 | B2 | 7/2018 | Spielmann et al. |
| 2014/0167423 | A1 | 7/2014 | Pischinger et al. |
| 2018/0045109 | A1 * | 2/2018 | Fortini ................. F02D 41/0087 |
| 2022/0242389 | A1 * | 8/2022 | Nose ....................... F02D 29/02 |

FOREIGN PATENT DOCUMENTS

JP          2009178021 A  *  8/2009

* cited by examiner

*Primary Examiner* — George C Jin
(74) *Attorney, Agent, or Firm* — Michael Best & Friedrich LLP

(57) ABSTRACT

A system for adjusting performance of an electric motor in a hybrid vehicle during a combustion event. The system includes a combustion engine including a cylinder, an electric motor including an electric motor shaft and connected to the combustion engine via a drive shaft, and an inverter controller connected to the electric motor. The inverter controller includes an electronic processor configured to receive a rotational position of the electric motor shaft, determine, based on the rotational position of the electric motor shaft, whether a combustion event is occurring in the cylinder, and when a combustion event is occurring in the cylinder, preform one selected from the group comprising increase torque produced by the electric motor and decrease the torque produced by the electric motor.

18 Claims, 6 Drawing Sheets

1. Intake - Air Is Drawn Into The Cylinder During The Intake Stroke.

2. Compression - Air In The Cylinder Is Compressed During The Compression Stroke. This Increases Cylinder Pressure. At Constant Torque, Crankshaft Torque, Crankshaft Speed Will Decrease, i.e. Reduction Of The Angular Acceleration.

3. Power - Air In The Cylinder Expands During The Compression Stroke. This Will Cause An Increase In Angular Acceleration.

4. Exhaust - Air Is Expelled From The Cylinder During The Exhaust Stroke.

ADJUSTING PERFORMANCE OF AN ELECTRIC MOTOR IN A HYBRID VEHICLE DURING A COMBUSTION EVENT

SUMMARY

Hybrid vehicles include combustion engines connected to what is often referred to as an "electric motor." It should be understood, however, that in the context of a hybrid vehicle powertrain, what is referred to as an electric motor is usually a combination of one or more electrical devices. At least one of the electrical devices operates as an electric motor and another one of the electrical devices acts as an electric generator. It may also be possible to have a single electrical device that operates as a motor in one mode and as a generator in a different mode. When the combustion engine includes a low number of cylinders (for example, three or less), the hybrid vehicle may experience operational roughness in the form of speed and current oscillations.

Currently, systems known as surge dampers exist for smoothing speed and current oscillations during transient load changes (for example, pressing or releasing the accelerator pedal, commonly called a "gas pedal", in a hybrid vehicle). Surge damper systems treat the drive train system of the hybrid vehicle as a spring damper system and control the torque delivery gradient in order to reduce drivetrain windup and ensuing speed oscillations. However, surge damper systems are ineffective at smoothing speed or current oscillations during a steady state operation of the combustion engine at constant engine speed. Steady state operation of the combustion engine occurs when the combustion engine operates at a constant speed, or when the speed of the combustion engine increases linearly (for example, after a tip-in event).

Embodiments described herein provide, among other things, a system and method for adjusting performance of an electric motor in a hybrid vehicle during a combustion event in steady or transient state operation of the combustion engine. As described in more detail below, an inverter controller connected to the electric motor uses sensor data (for example, electric motor shaft angular acceleration data, electric motor torque variation data, and electric motor current variation data) to determine when combustion events will occur in a cylinder of the internal combustion engine. Combustion events generally occur near the top dead center (TDC) location associated with the cylinder. The inverter controller may alter the performance of the electric motor when the combustion event occurs to increase operational smoothness or smooth oscillations in rotational speed or oscillations in current in the electric motor to provide a better driving experience or preserve the components of the electric motor.

One embodiment provides a system for adjusting performance of an electric motor in a hybrid vehicle during a combustion event. The system includes a combustion engine including a cylinder, an electric motor including an electric motor shaft and connected to the combustion engine via a drive shaft, and an inverter controller connected to the electric motor. The inverter controller includes an electronic processor configured to receive a rotational position of the electric motor shaft; determine, based on the rotational position of the electric motor shaft, whether a combustion event is occurring in the cylinder; and when a combustion event is occurring in the cylinder, preform one selected from the group comprising increase torque produced by the electric motor and decrease the torque produced by the electric motor.

Another embodiment provides a method for adjusting performance of an electric motor in a hybrid vehicle during a combustion event. The method includes receiving, with an electronic processor, a rotational position of an electric motor shaft of an electric motor; determining, based on the rotational position of the electric motor shaft, whether a combustion event is occurring in a cylinder of a combustion engine connected to the electric motor via a drive shaft and when a combustion event is occurring in the cylinder, preforming one selected from the group comprising increasing torque produced by the electric motor and decreasing the torque produced by the electric motor.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
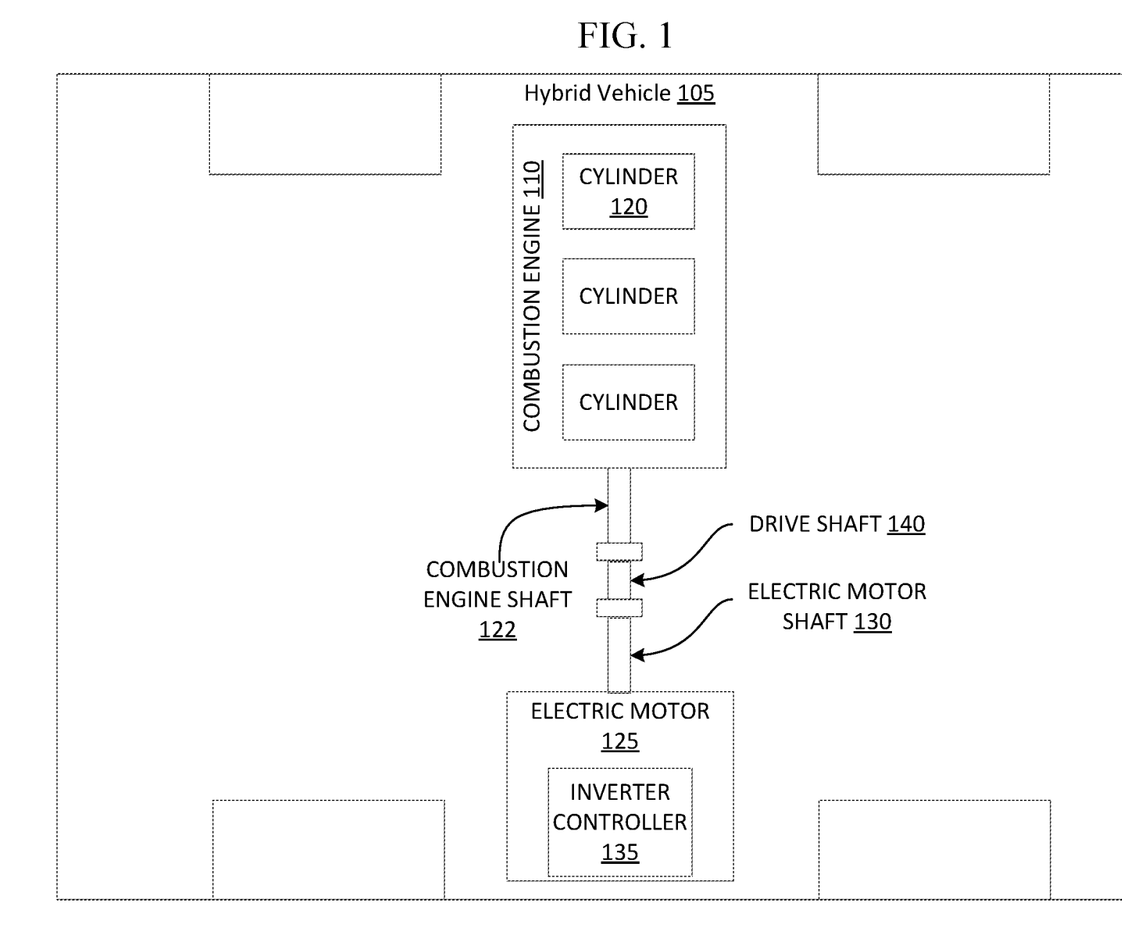
FIG. 1 is a block diagram of a system for adjusting performance of an electric motor in a hybrid vehicle during a combustion event according to one embodiment.

FIG. 1 illustrates one example of a system 100 for adjusting performance of an electric motor in a hybrid vehicle during a combustion event. The system 100 includes a hybrid vehicle 105. The hybrid vehicle 105, although illustrated as a four-wheeled vehicle, may encompass various types and designs of vehicles. For example, the hybrid vehicle 105 may be an automobile, a motorcycle, a truck, a bus, a semi-tractor, and others.

Figure 2:
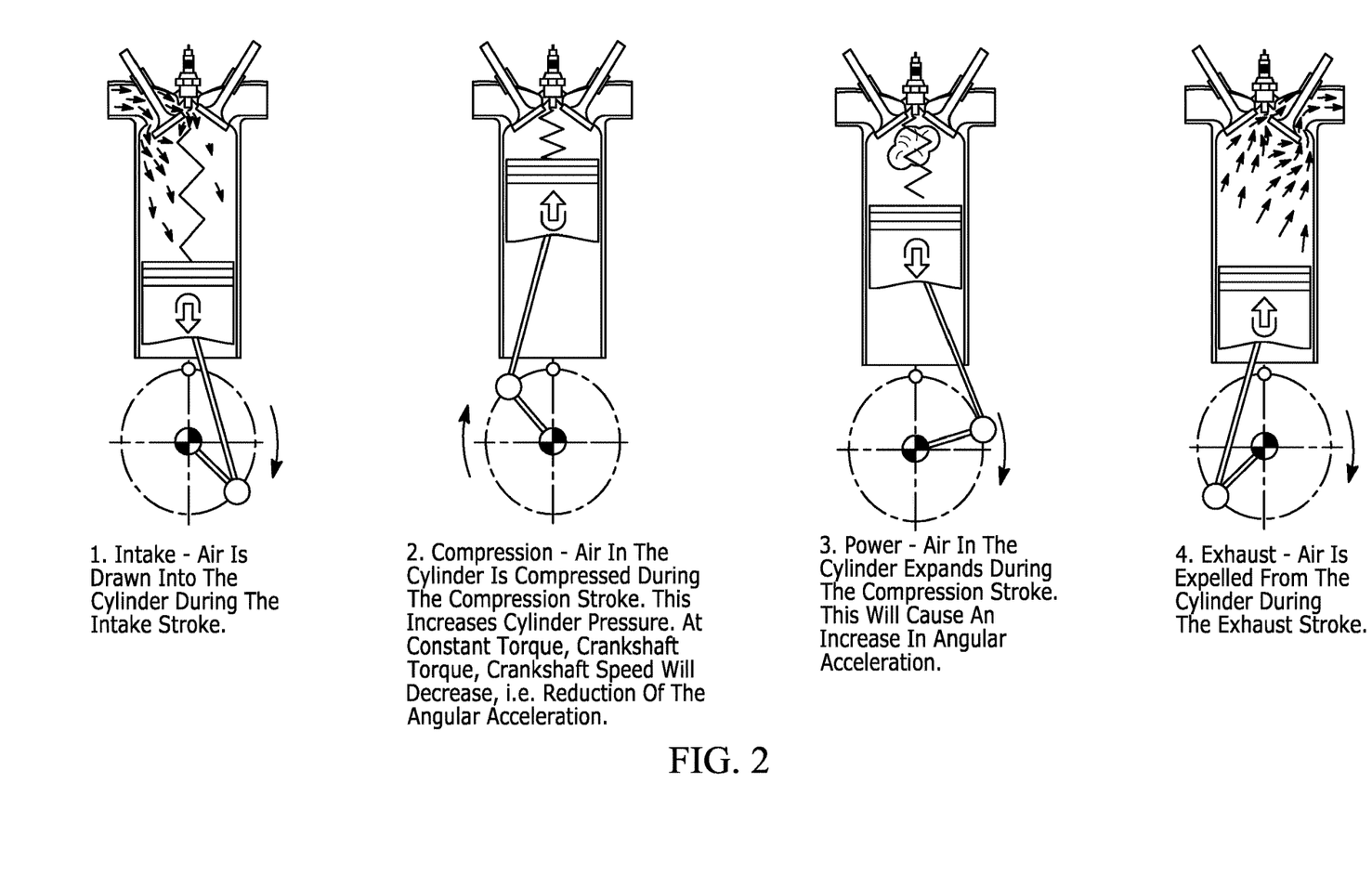
FIG. 2 is an illustrative example of a combustion cycle in a cylinder of the system of FIG. 1.

The hybrid vehicle 105 includes a combustion engine 110 and an electric motor 125. The combustion engine 110 includes one or more cylinders (for example, a cylinder 120) which produce combustion events to move pistons up and down to turn a combustion engine shaft 122 (a crankshaft). An illustrative example of a combustion cycle in a cylinder is provided in FIG. 2. A combustion event occurs between step "2. Compression" and step "3. Power" of FIG. 2, when the piston is at or near a top dead center (TDC) position. In some embodiments, the combustion engine 110 includes a limited number of cylinders (for example, three cylinders or less). It should be understood that the three cylinders illustrated in FIG. 1 are purely illustrative and the combustion engine 110 may include a different number of cylinders than illustrated in FIG. 1. The electric motor 125 includes an electric generator. The electric generator charges a battery (not illustrated). The battery provides the electric motor 125 power necessary to spin an electric motor shaft 130. An inverter controller 135 is connected to the electric motor 125 (for example, the inverter controller 135 may be mounted to a housing of the electric motor 125 or included in the housing of the electric motor 125) and controls the functionality of the electric motor 125 including the rate at which the electric motor 125 rotates the electric motor shaft 130. The electric motor shaft 130 and the combustion engine shaft 122 are connected by a drive shaft 140 via one or more couplers. The drive shaft 140 is connected to a transmission (not shown) and the rotational torque of the drive shaft 140 as distributed by the transmission and wheel axles causes rotation of the drive wheels of the hybrid vehicle 105.

Figure 3:
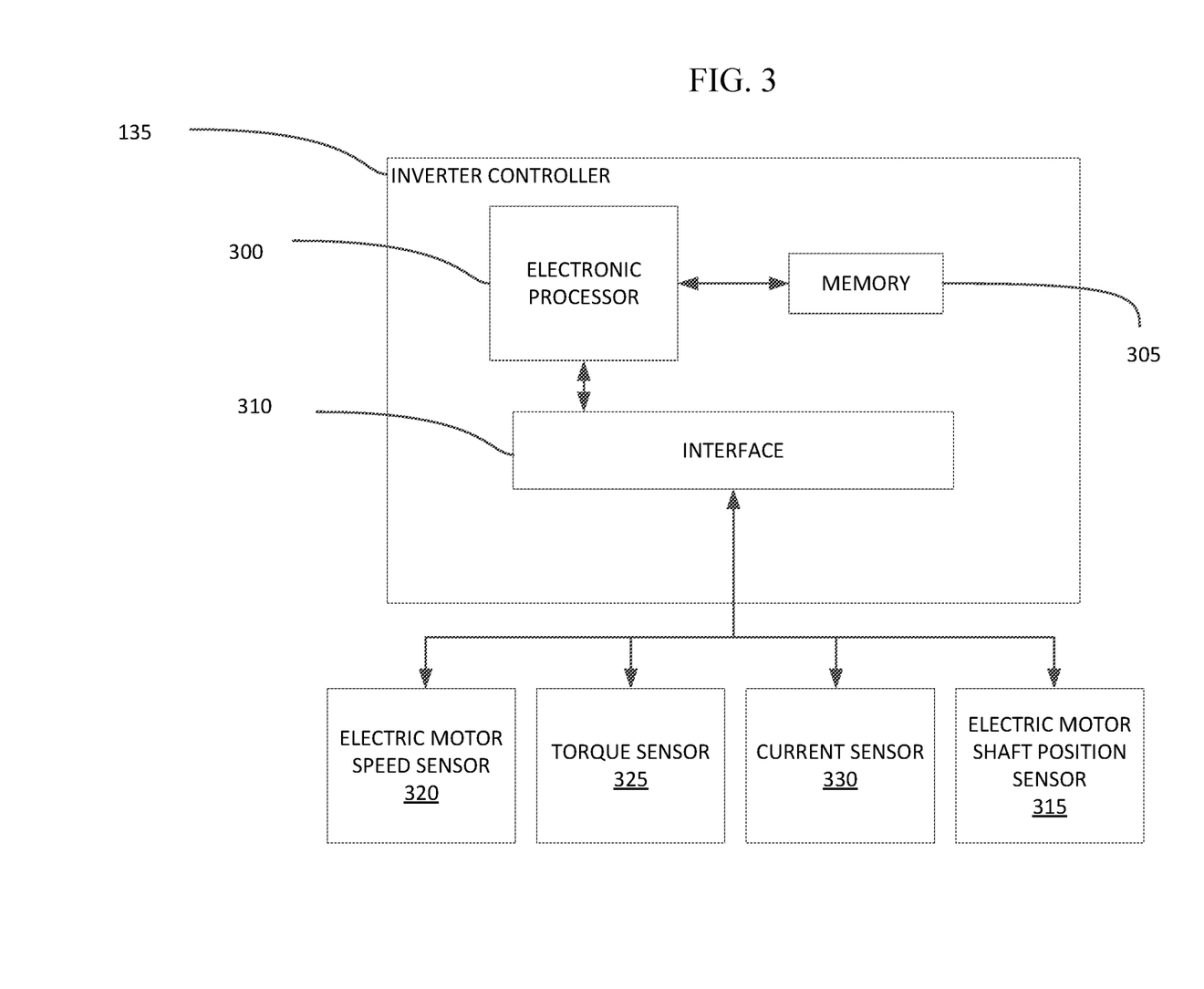
FIG. 3 is a block diagram of an inverter controller of the system of FIG. 1 and a plurality of sensors, from which the inverter controller may receive data according to one embodiment.

FIG. 3 is a block diagram of the inverter controller 135 of the system of FIG. 1 and sensors that provide data to the inverter controller 135. The inverter controller 135 includes a plurality of electrical and electronic components that provide power, operation control, and protection to the components and modules within the inverter controller 135. The inverter controller 135 includes, among other things, an electronic processor 300 (such as a programmable electronic microprocessor, microcontroller, or similar device), a memory 305 (for example, a non-transitory, machine readable medium), and an interface 310. The electronic processor 300 is communicatively connected to the memory 305 and the interface 310. In some embodiments, the electronic processor 300, in coordination with software stored in the memory 305 and information from the sensors, is configured to implement, among other things, the methods described herein.

The inverter controller 135 may be implemented in several independent controllers (for example, programmable electronic controllers) each configured to perform specific functions or sub-functions. Additionally, the inverter controller 135 may contain sub-modules that include additional electronic processors, memory, or application specific integrated circuits (ASICs) for handling communication functions, processing of signals, and application of the methods listed below. In other embodiments, the inverter controller 135 includes additional, fewer, or different components.

As illustrated in FIG. 3, the electronic processor 300 may communicate with one or more sensors via the interface 310.

The one or more sensors include an electric motor shaft position sensor 315 (for example, a resolver or encoder), an electric motor speed sensor 320, a torque sensor 325 (for example, a transducer), and a current sensor 330 (for example, an ammeter or a multimeter). It should be understood that the electric motor shaft position sensor 315, electric motor speed sensor 320, torque sensor 325, and current sensor 330, while not illustrated in FIG. 1, are included in the system 100. In some embodiments, the electric motor shaft position sensor 315, electric motor speed sensor 320, and torque sensor 325, are positioned on or adjacent to the electric motor shaft 130. In some embodiments, the current sensor 330 is mounted within the electric motor 125 (specifically, within the electric generator).

In some embodiments, the electronic processor 300 determines an actual rotational position associated with a cylinder (for example, the cylinder 120). The actual rotational position is a position in the rotational cycle of the electric motor shaft 130 where a combustion event is determined to occur. In some embodiments, the actual rotational position associated with the cylinder 120 must be redetermined when the motor and generator included in the electric motor 125 are separated or when the electric motor 125 and the combustion engine 110 are separated. For example, in some embodiments, when the hybrid vehicle 105 does not include a clutch between the combustion engine 110 and electric motor 125, the actual rotational position associated with the cylinder 120 is determined or redetermined by the electronic processor 300 during manufacture of the hybrid vehicle 105, maintenance of the hybrid vehicle 105, or both. In some embodiments, when the hybrid vehicle 105 includes a clutch between the combustion engine 110 and electric motor 125, the actual rotational position associated with the cylinder 120 is determined or redetermined by the electronic processor 300 when the clutch closes.

In some embodiments, the electronic processor 300 determines the actual rotational position based on one or more selected from the group comprising electric motor shaft angular acceleration data, electric motor torque variation data, and electric motor current variation data.

Figure 4:
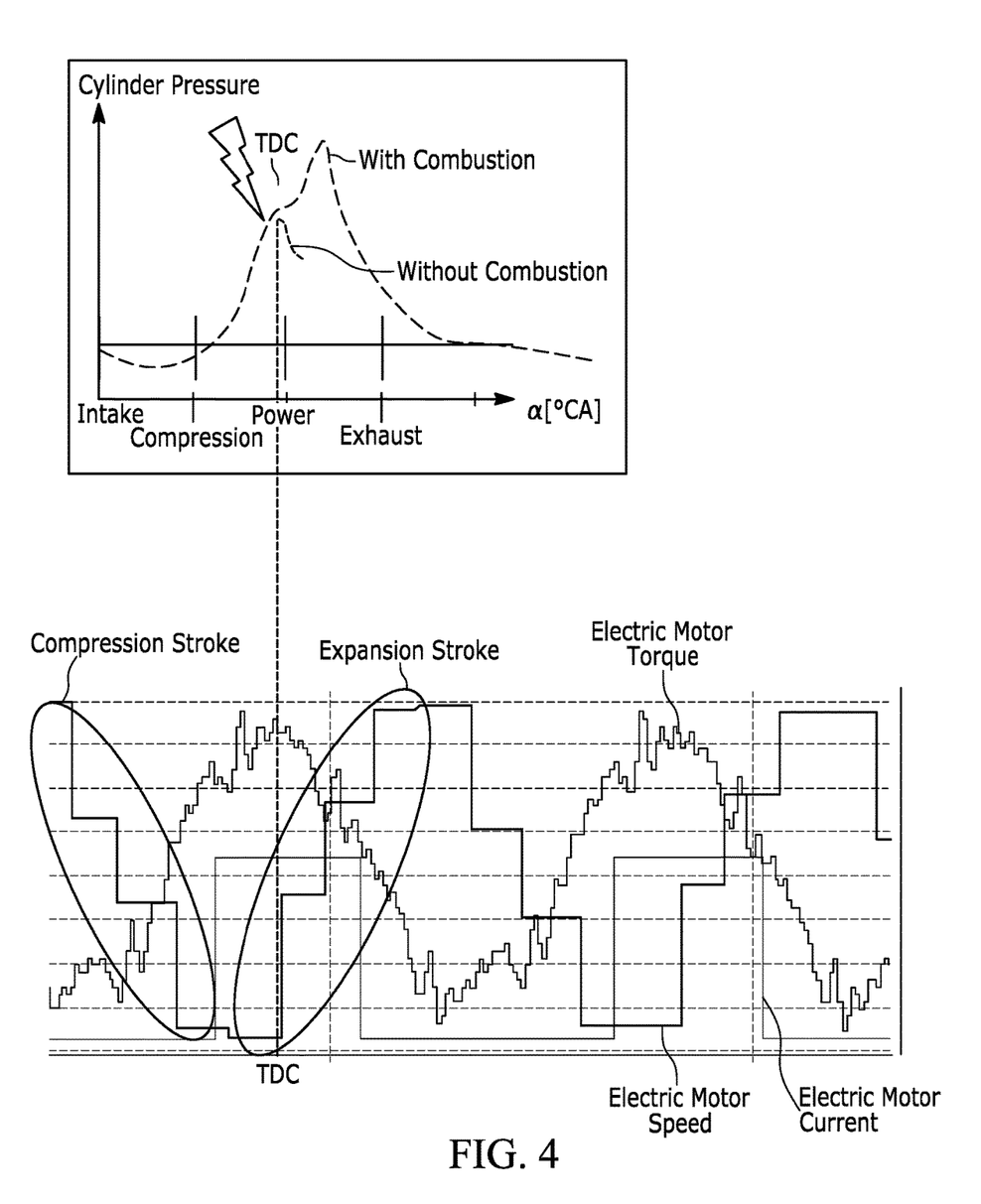
FIG. 4 is an illustrative example of determining an occurrence of a combustion event based on electric motor shaft angular acceleration variation data.

For example, in some embodiments, the electronic processor 300 determines the actual rotational position based on the electric motor shaft angular acceleration data obtained using data from, for example, the electric motor speed sensor 320. Continuing with the above example, when the angular acceleration (the gradient of the angular velocity) of the electric motor shaft 130 changes from negative to positive, the electronic processor 300 determines a rotational position of the electric motor shaft 130, via, for example, the electric motor shaft position sensor 315. In some embodiments, the rotational position of the electric motor shaft 130 determined when the angular acceleration of the electric motor shaft 130 changes from negative to positive, is determined to be the actual rotational position. FIG. 4 is an illustrative example of determining an occurrence of a combustion event based on electric motor shaft angular acceleration variation data. FIG. 4 illustrates data collected from a hybrid vehicle with a combustion engine that has a single cylinder. As can be seen in FIG. 4 the angular acceleration of the electric motor shaft is negative during a compression stroke (illustrated in "2. Compression" of FIG. 2) of the cylinder and the angular acceleration of the electric motor shaft is positive during the expansion stroke after ignition (illustrated in "3. Power" of FIG. 2) of the cylinder.

Figure 5:
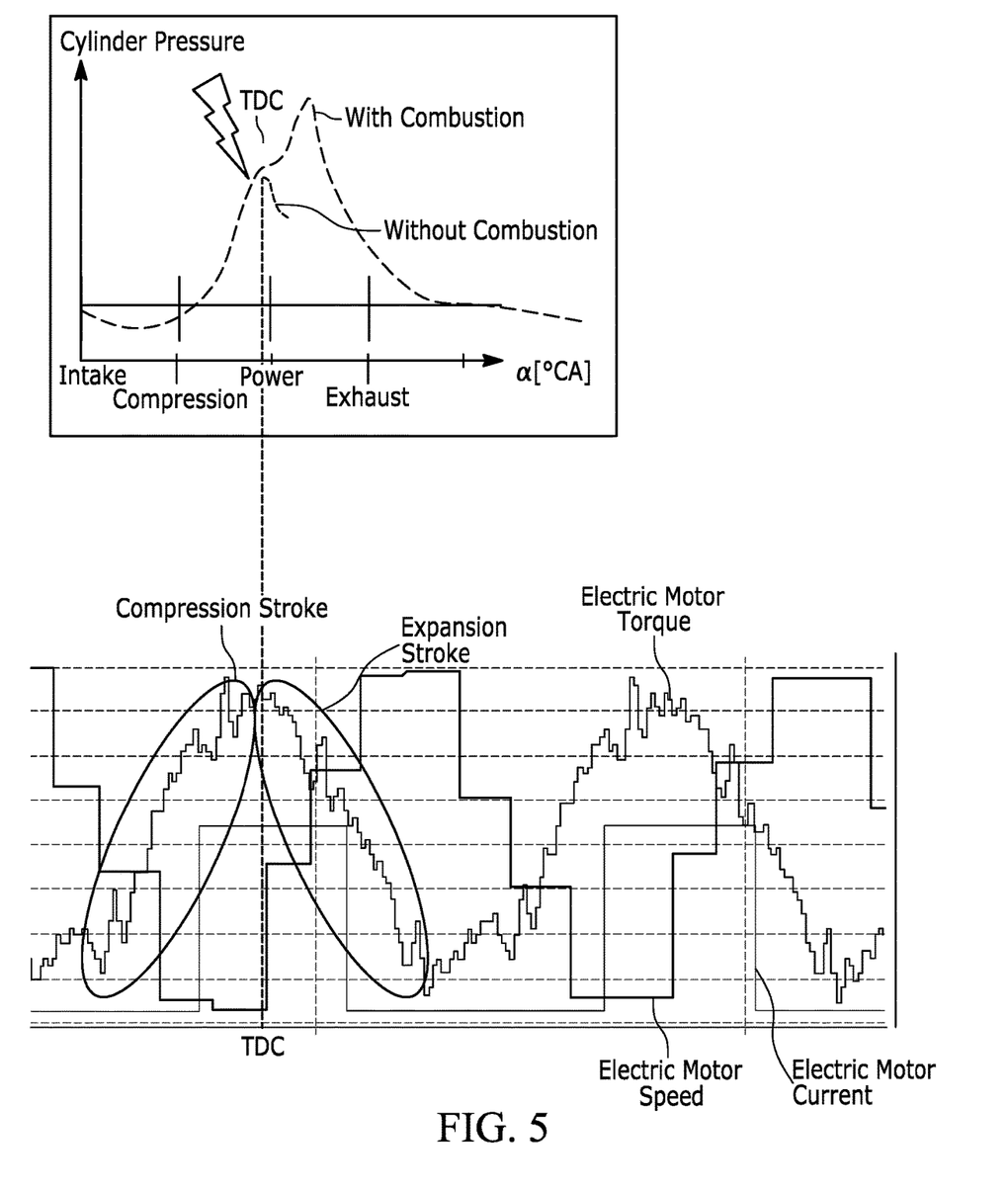
FIG. 5 is an illustrative example of determining an occurrence of a combustion event based on electric motor torque variation data.

In another example, the electronic processor 300 determines the actual rotational position based on electric motor torque variation data received from, for example, the torque sensor 325. When a gradient of the torque of the electric motor shaft 130 changes from positive to negative, the electronic processor 300 determines a rotational position of the electric motor shaft 130, via, for example, the electric motor shaft position sensor 315. In some embodiments, the rotational position of the electric motor shaft 130 determined when the gradient of the torque of the electric motor shaft 130 changes from positive to negative, is determined to be the actual rotational position. FIG. 5 is an illustrative example of determining an occurrence of a combustion event based on electric motor torque variation data. FIG. 5 illustrates data collected from a hybrid vehicle with a combustion engine that has a single cylinder. As can be seen in FIG. 5, the gradient of the torque of the electric motor shaft is positive during a compression stroke (illustrated in "2. Compression" of FIG. 2) of the cylinder and the gradient of the torque of the electric motor shaft is negative during the expansion stroke after ignition (illustrated in "3. Power" of FIG. 2) of the cylinder. It should be understood that the methods of determining an actual rotational position described herein are examples and there may be other ways by which the electronic processor 300 determines the actual rotational position based on one or more selected from the group comprising electric motor shaft angular acceleration data, electric motor torque variation data, and electric motor current variation data.

In some of the examples provided herein, above, a change in a gradient is evaluated or otherwise assessed. In some cases, a change from positive to negative occurs. In other cases, a change from negative to positive occurs. In many instances the particular change is not critical and simply evaluating the gradient sign change is sufficient. In addition, it may be sufficient to evaluate when the gradient crosses a zero point as it changes either from negative to positive or from positive to negative.

In some embodiments, when the combustion engine 110 is a four stroke engine, there is an intermediate change in the sign of a gradient associated with the torque of the electric motor shaft 130, the angular acceleration of the electric motor shaft 130 (the gradient of angular velocity of the electric motor shaft 130), or the gradient associated with the current of the electric motor 125 which may not correspond to a combustion event. For example, when an exhaust valve or an intake valve in the combustion engine 110 opens, the electric motor shaft 130 may experience angular acceleration even though a combustion event did not occur. However, gradient sign changes associated with combustion events will be associated with greater rates of change in angular velocity of the electric motor shaft 130, torque of the electric motor shaft 130, or current of the electric motor 125 than gradient sign changes not associated with combustion events. Therefore, in some embodiments, the electronic processor 300 may determine a gradient sign change is associated with a combustion event when an absolute value of a rate of change in angular velocity of the electric motor shaft 130, torque of the electric motor shaft 130, or current of the electric motor 125 is greater than a predetermined threshold.

In some embodiments, when the combustion engine 110 includes multiple cylinders, the electronic processor 300 may receive a number of cylinders included in the combustion engine 110, a position associated with each cylinder, or both. For example, in a three cylinder combustion engine, the electronic processor 300 may receive information specifying that the combustion engine 110 has three cylinders and determine that there is 240 degrees of separation between each combustion event. In some embodiments, the electronic processor 300 receives the information as input from a technician via, for example, a user interface of a device in communication with the inverter controller 135.

In some embodiments where the combustion engine 110 includes multiple cylinders, the electronic processor 300 may determine, for each cylinder, an actual rotational position based on one or more selected from the group comprising electric motor shaft angular acceleration data, electric motor torque variation data, and electric motor current variation data. In other embodiments where the combustion engine 110 includes multiple cylinders, the electronic processor 300 may determine, for a single cylinder (for example, the cylinder 120), an actual rotational position based on one or more selected from the group comprising electric motor shaft angular acceleration data, electric motor torque variation data, and electric motor current variation data and determine actual rotational positions for each cylinder (other than the cylinder 120) based on the actual rotational position associated with the cylinder 120 and the received information described above, For example, the electronic processor 300 may determine that the actual rotational position associated with the cylinder 120 is five degrees and receive information indicating that the combustion engine 110 has three cylinders. Based on the received information and the actual rotational position associated with the cylinder 120 determine that combustion events occur at five degrees, 245 degrees, and 485 degrees.

Figure 6:
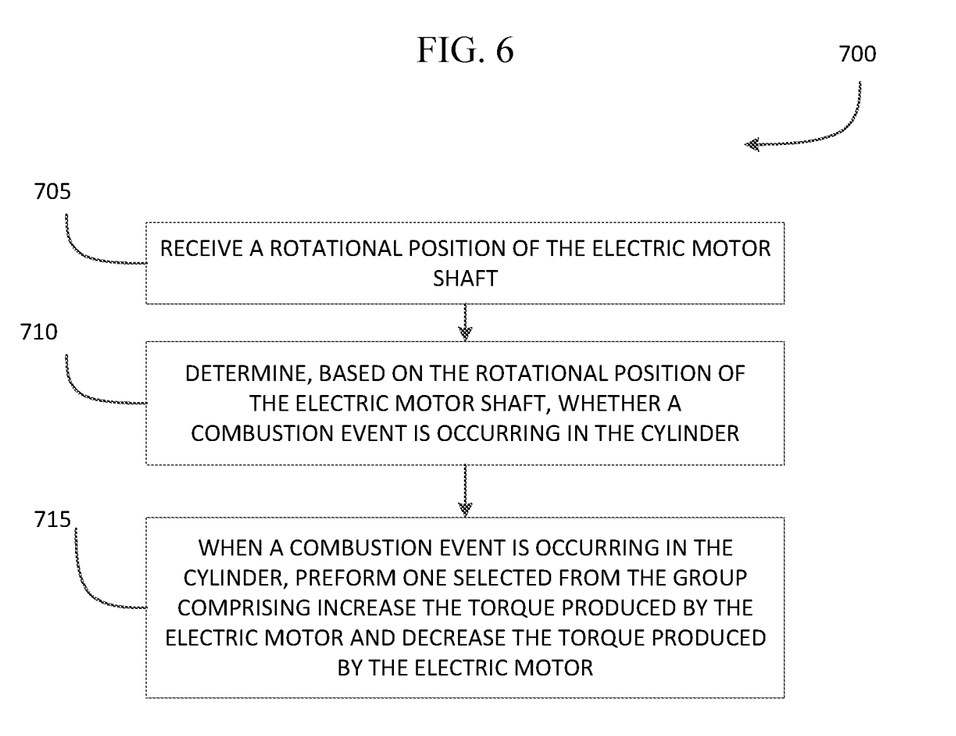
FIG. 6 is a flowchart of a method for using the system of FIG. 1 to adjust performance of an electric motor in a hybrid vehicle during a combustion event according to one embodiment.

FIG. 6 illustrates a method 700 for adjusting the performance of an electric motor in a hybrid vehicle during a combustion event. In some embodiments, the method 700 begins at step 705 when the electronic processor 300 receives a rotational position of the electric motor shaft 130 from, for example, the electric motor shaft position sensor 315. In some embodiments, at step 710, the electronic processor 300 determines, based on the rotational position of the electric motor shaft 130 (the received rotational position of the electric motor shaft 130) whether a combustion event is occurring in the cylinder (for example, the cylinder 120). For example, the electronic processor 300 may determine whether a combustion event is occurring in the cylinder 120 by comparing the received rotational position to an actual rotational position associated with the cylinder 120. The electronic processor 300 may retrieve the actual rotational position associated with the cylinder 120 from the memory 305. In some embodiments, when the actual rotational position matches the received rotational position, the electronic processor 300 determines that a combustion event is occurring.

In some embodiments, when a combustion event is occurring in the cylinder 120, the electronic processor 300 preforms one selected from the group comprising increase the torque produced by the electric motor 125 and decrease the torque produced by the electric motor 125. In some embodiments, the increase in torque is proportional to an angular rotation acceleration of the drive shaft 140 caused by a combustion event. In some embodiments, the amount the electronic processor 300 increases the torque by is a value included in the memory 305. Combustion events momentarily increase the rotational speed of the drive shaft 140 and the speed of the hybrid vehicle 105. By increasing the torque generated by the electric motor 125, the rotational speed of the drive shaft 140 (and, therefore, the speed of the hybrid vehicle 105) will remain more constant. By reducing speed oscillations in the rotational speed of the drive shaft 140, the electronic processor 300 reduces the likelihood that a driver or passenger of the hybrid vehicle 105 will perceive any operational roughness (for example, noise or vehicle speed oscillations) associated with the hybrid vehicle 105. By reducing speed oscillations in the rotational speed of the drive shaft 140, the electronic processor 300 may reduce the chance that harmonics produced by speed oscillations cause the couplers connecting the electric motor 125, drive shaft 140, and combustion engine 110 to break. However, increasing the torque generated by the electric motor 125 during a combustion event causes greater current oscillations in the electric motor 125 and the current oscillations may damage the components included in the electric motor 125.

In some embodiments, the electronic processor 300 decreases the torque produced by the electric motor 125 when a combustion event is occurring. In some embodiments, the decrease in torque is proportional to an increase in current in the electric motor 125 caused by a combustion event. In some embodiments, the amount the electronic processor 300 decreases the torque by is a value included in the memory 305. As mentioned above, current oscillations damage the hardware of the electric motor 125. Decreasing the torque produced by the electric motor 125 during a combustion event decreases the current in the electric motor 125 during a combustion event and smooths current oscillations. Decreasing the torque produced by the electric motor 125 during a combustion event may increase the life of components of the electric motor 125. However, decreasing the torque produced by the electric motor 125 during a combustion event will increase the oscillations in the rotational speed of the drive shaft 140 and the speed of the hybrid vehicle 105.

In some embodiments, the electronic processor 300 is configured to periodically (for example, every ten minutes) validate the actual rotational position during a drive cycle of the hybrid vehicle 105 by changing the actual rotational position and evaluating for improved or degraded operational smoothness. For example, depending on a speed load point of the combustion engine 110, the rotational position where a spark point (a combustion event) occurs may change. In some embodiments, the actual rotational position is learned or determined based on one or more selected from a group comprising electric motor shaft angular acceleration data, electric motor torque variation data, and electric motor current variation data for one speed load point of the combustion engine 110. When the combustion engine 110 operates at a different speed load point, it may be advantageous to "phase the controls" or change the actual rotational position by one or more degrees (for example, from 480 degrees to 482 degrees or 478 degrees). In some embodiments, the electronic processor 300 performs the method 700 using the changed actual rotational position.

In some embodiments, the electronic processor 300 determines whether performing the method 700 using the changed actual rotational position improves or degrades the operational smoothness of the hybrid vehicle 105 by measuring, for example, speed oscillations or current oscillations using the electric motor speed sensor 320 or current sensor 330. For example, when performing the method 700 using the changed actual rotational position to increase the torque produced by the electric motor 125 causes greater speed oscillations than performing the method 700 using the actual rotational position to increase the torque produced by the electric motor 125, the electronic processor 300 determines that the changed actual rotational position degrades the operational smoothness of the hybrid vehicle 105.

In some embodiments, when the electronic processor 300 determines that performing the method 700 with the changed actual rotational position degrades the operational smoothness of the hybrid vehicle 105, the electronic processor 300 changes the actual rotational position again based on the actual rotational position and changes previously made to the actual rotational position. In some embodiments, when the electronic processor 300 determines that the changed actual rotational position improved the operational smoothness of the hybrid vehicle 105, the electronic processor 300 stores the changed actual rotational position in the memory 305 and performs the method 700 using the changed actual rotational position. In other embodiments, the electronic processor 300 changes the actual rotational position and evaluates the effect changing the actual rotational position has on the operational smoothness of the hybrid vehicle 105, until the electronic processor 300 determines an actual rotational position that causes the greatest operational smoothness and stores the actual rotational position that causes the greatest operational smoothness in the memory 305 and performs the method 700 using the actual rotational position that causes the greatest operational smoothness.

Thus, the embodiments described herein provide, among other things, a system and a method for adjusting performance of an electric motor in a hybrid vehicle during a combustion event. Various features and advantages of the embodiments are set forth in the following claims.

What is claimed is:

1. A system for adjusting performance of an electric motor in a hybrid vehicle during a combustion event, the system comprising:
   a combustion engine including a cylinder;
   an electric motor including an electric motor shaft and connected to the combustion engine via a drive shaft; and
   an inverter controller connected to the electric motor, the inverter controller including an electronic processor configured to
      receive a rotational position of the electric motor shaft;
      determine, based on the rotational position of the electric motor shaft, whether a combustion event is occurring in the cylinder; and
      when a combustion event is occurring in the cylinder, preform one selected from the group comprising increase torque produced by the electric motor and decrease the torque produced by the electric motor.

2. The system according to claim 1, wherein the increase in torque is proportional to an angular rotation acceleration of the drive shaft caused by the combustion event and the decrease in torque is proportional to an increase in current in the electric motor caused by the combustion event.

3. The system according to claim 1, the system further comprising a memory connected to the electronic processor and wherein the electronic processor is further configured to determine, based on the rotational position of the electric motor shaft, whether the combustion event is occurring in the cylinder by comparing the rotational position of the electric motor shaft to an actual rotational position associated with the cylinder and stored in the memory.

4. The system according to claim 3, wherein the electronic processor is configured to determine the actual rotational position associated with the cylinder based on one or more selected from a group comprising electric motor shaft angular acceleration data, electric motor torque variation data, and electric motor current variation data.

5. The system according to claim 4, wherein the electronic processor is configured to determine the actual rotational position based on the electric motor shaft angular acceleration data by determining a rotational position of the electric motor shaft when angular acceleration of the electric motor shaft changes from negative to positive to be the actual rotational position associated with the cylinder.

6. The system according to claim 4, wherein the electronic processor is configured to determine the actual rotational position based on the electric motor torque variation data by
determining a rotational position of the electric motor shaft when a gradient of torque of the electric motor shaft is changes from positive to negative to be the actual rotational position associated with the cylinder.

7. The system according to claim 4, wherein, when the hybrid vehicle does not include a clutch between the combustion engine and the electric motor, the electronic processor is configured to determine the actual rotational position during manufacture of the hybrid vehicle, maintenance of the hybrid vehicle, or both.

8. The system according to claim 4, wherein the electronic processor is configured to periodically validate the actual rotational position during a drive cycle of the hybrid vehicle by changing the actual rotational position and evaluating for improved or degraded operational smoothness.

9. The system according to claim 4, wherein, when the hybrid vehicle includes a clutch between the combustion engine and the electric motor, the electronic processor is configured to determine the actual rotational position when the clutch closes.

10. A method for adjusting performance of an electric motor in a hybrid vehicle during a combustion event, the method comprising:
receiving, with an electronic processor, a rotational position of an electric motor shaft of an electric motor;
determining, based on the rotational position of the electric motor shaft, whether a combustion event is occurring in a cylinder of a combustion engine connected to the electric motor via a drive shaft; and
when a combustion event is occurring in the cylinder, preforming one selected from the group comprising increasing torque produced by the electric motor and decreasing the torque produced by the electric motor.

11. The method according to claim 10, wherein increasing the torque produced by the electric motor includes increasing the torque by a value proportional to an angular rotation acceleration of the drive shaft caused by the combustion event and decreasing the torque produced by the electric motor includes decreasing the torque by a value proportional to an increase in current in the electric motor caused by the combustion event.

12. The method according to claim 10, the method further comprising determining, based on the rotational position of the electric motor shaft, whether the combustion event is occurring in the cylinder by comparing the rotational position of the electric motor shaft to an actual rotational position associated with the cylinder and stored in memory.

13. The method according to claim 12, the method further comprising determining the actual rotational position associated with the cylinder based on one or more selected from a group comprising electric motor shaft angular acceleration data, electric motor torque variation data, and electric motor current variation data.

14. The method according to claim 13, wherein determining the actual rotational position based on the electric motor shaft angular acceleration data includes
determining a rotational position of the electric motor shaft when angular acceleration of the electric motor shaft changes from negative to positive to be the actual rotational position associated with the cylinder.

15. The method according to claim 13, wherein determining the actual rotational position based on the electric motor torque variation data includes
determining a rotational position of the electric motor shaft when a gradient of torque of the electric motor shaft is changes from positive to negative to be the actual rotational position associated with the cylinder.

16. The method according to claim 13, wherein, when the hybrid vehicle does not include a clutch between the combustion engine and the electric motor, determining the actual rotational position associated with the cylinder includes determining the actual rotational position during manufacture of the hybrid vehicle, maintenance of the hybrid vehicle, or both.

17. The method according to claim 16, the method further comprising periodically validating the actual rotational position during a drive cycle of the hybrid vehicle by changing the actual rotational position and evaluating for improved or degraded operational smoothness.

18. The method according to claim 13, wherein, when the hybrid vehicle includes a clutch between the combustion engine and the electric motor, determining the actual rotational position associated with the cylinder includes determining the actual rotational position when the clutch closes.

* * * * *